(12) United States Patent
Richard

(10) Patent No.: US 6,708,086 B2
(45) Date of Patent: Mar. 16, 2004

(54) VEHICLE COMPUTER

(76) Inventor: Sue M. Richard, 265 River Rd., West Willington, CT (US) 06279

( * ) Notice: Subject to any disclaimer, the term of this patent is extended or adjusted under 35 U.S.C. 154(b) by 0 days.

(21) Appl. No.: 09/885,106

(22) Filed: Jun. 21, 2001

(65) Prior Publication Data

US 2002/0111715 A1 Aug. 15, 2002

Related U.S. Application Data

(60) Provisional application No. 60/254,152, filed on Dec. 11, 2000.

(51) Int. Cl.[7] ................................................ G05D 1/00
(52) U.S. Cl. .............................. 701/1; 701/35; 340/426; 455/456
(58) Field of Search ................... 701/1, 2, 35; 340/426, 340/438, 539, 425.5; 455/456; 345/173

(56) References Cited

U.S. PATENT DOCUMENTS

| | | | |
|---|---|---|---|
| 4,954,959 A | | 9/1990 | Moroto et al. .............. 701/211 |
| 5,089,826 A | | 2/1992 | Yano et al. .................. 342/457 |
| 5,150,609 A | | 9/1992 | Ebner et al. ................ 73/117.3 |
| 5,310,999 A | | 5/1994 | Claus et al. ................ 235/384 |
| 5,513,244 A | | 4/1996 | Joao et al. .................. 455/404 |
| 5,534,759 A | | 7/1996 | Evans et al. ................ 318/139 |
| 5,590,040 A | | 12/1996 | Abe et al. ...................... 701/35 |
| 5,650,929 A | * | 7/1997 | Potter et al. ................ 455/456 |
| 5,664,110 A | | 9/1997 | Green et al. .................. 705/26 |
| 5,691,695 A | | 11/1997 | Lahiff ......................... 340/461 |
| 5,794,164 A | | 8/1998 | Beckert et al. ............. 455/3.06 |
| 5,801,614 A | * | 9/1998 | Kokubu .................... 340/425.5 |
| 5,805,082 A | | 9/1998 | Hassett ........................ 340/928 |
| 5,847,704 A | | 12/1998 | Hartman ...................... 347/106 |
| 5,982,298 A | | 11/1999 | Lappenbusch et al. ....... 340/905 |
| 5,986,543 A | | 11/1999 | Johnson ....................... 340/426 |
| 5,995,626 A | | 11/1999 | Nishioka et al. ............... 705/76 |
| 6,009,363 A | * | 12/1999 | Beckert et al. ................ 701/33 |
| 6,055,478 A | * | 4/2000 | Heron ......................... 701/213 |
| 6,205,327 B1 | * | 3/2001 | Sentinelli .................... 455/407 |
| 6,223,348 B1 | * | 4/2001 | Hayes et al. ................. 725/152 |
| 6,246,400 B1 | * | 6/2001 | Bush .......................... 345/327 |
| 6,297,731 B1 | * | 10/2001 | Flick .......................... 340/426 |
| 6,373,472 B1 | * | 4/2002 | Palalau et al. ............. 345/173 |
| 6,450,407 B1 | * | 9/2002 | Freeman et al. ............ 235/492 |

FOREIGN PATENT DOCUMENTS

| | | |
|---|---|---|
| DE | 42 03 865 A1 | 3/1993 |
| EP | 0 511 795 A1 | 4/1992 |
| JP | 62-255260 | 11/1987 |
| JP | 5-314325 | 11/1993 |
| JP | 6-186051 | 7/1994 |
| WO | WO 94/25936 * | 4/1994 |

* cited by examiner

*Primary Examiner*—Marthe Y. Marc-Coleman
(74) *Attorney, Agent, or Firm*—Litman Law Offices

(57) ABSTRACT

A vehicle computer system that integrates a diverse array of electronic systems and services into a single, user-friendly system that allows a user to shop, order and purchase items, pay for tolls, communicate, determine geographic location, and ascertain weather conditions. The on-board computer system employs a distinctive touch screen display, and has the capacity to play both audio and video, to monitor and control a vehicle's operation, to provide security to a vehicle, and to connect to the Internet.

9 Claims, 11 Drawing Sheets

VEHICLE COMPUTER

CROSS-REFERENCE TO RELATED APPLICATION

This application claims the benefit of U.S. Provisional Patent Application Ser. No. 60/254,152, filed Dec. 11, 2000.

BACKGROUND OF THE INVENTION

1. Field of the Invention

The present invention relates generally to computer systems and more particularly, to an on-board computer system for vehicles. The on-board computer system of the present invention allows the user to access a broad spectrum of information, goods, and services from the convenience of the user's vehicle.

2. Description of Related Art

In today's highly mobile society, a person spends a substantial amount of time in various types of vehicles traveling from one destination to another. The average commuter spends a large portion of the week in his or her vehicle traveling back and forth between home and work. The number of people owning or renting airplanes for business or pleasure has dramatically increased and recreational boating is a major consumer market. Modern vehicles contain a number of independent electronic systems, for example, an AM/FM radio, a CD player, speakers, and security systems. Cellular communication systems such as cell phones are commonplace and allow a person to transact telephone calls from his or her vehicle. Many vehicles are even equipped with a navigational system that incorporates a global positioning system (GPS) receiver.

Today's consumers have a plethora of products and services available to them; however, these goods and services are provided by a broad spectrum of diverse vendors and, given the fact that modern consumers spend a significant portion of their time inside their vehicles, whether for business or pleasure, makes it extremely advantageous to consumers to have a way to readily access these goods and services from the convenience of their vehicles. Whether for business or pleasure, information accessibility is invaluable. Obtaining accurate information quickly can mean closing an important business deal, avoiding traffic congestion, or finding the location of the nearest hospital in an emergency. Although, the various electronic systems of a vehicle are useful, they are operated in a haphazard, uncoordinated manner with each system operating essentially independent of the other systems. In addition, this invention is not harmful to a human being who has a pacemaker-medtronic or fibrolator. It is known that when a human has a pacemaker, a cellular phone 3 watts or more must be 12 inches away from the device. The frequency signals from a cellular phone can adjust the heart rate.

The prior art is replete with computer systems designed to function as part of a vehicular system but none of the prior art vehicular computer systems possess the unique and innovative characteristics and features of the on-board computer system of the present invention. U.S. Pat. No. 5,150,609, issued on Sep. 29, 1992 to Roland Ebner et al., describes an on board computer for a motor vehicle. The on board computer for a motor vehicle is equipped with a microprocessor which acquires input signals from analog or digital generators and derives displayed values or displays data from them. These displayed values or displayed data are displayed on a display system assigned to the on-board computer which is preferably arranged within an instrument cluster of the dashboard of the motor vehicle. The on-board computer is also used as a diagnostic system for several control units installed into the motor vehicle when the computer is switched to a diagnostic mode and the corresponding set of data is selected by means of the function switch of the on-board computer.

A vehicle computer system is described in U.S. Pat. No. 5,794,164, issued on Aug. 11, 1998 to Richard Beckert et al. The vehicle computer system has a housing sized to be mounted in a vehicle dashboard or other appropriate location. A computer is mounted within the housing. The computer has two independent processors. One processor, which runs the operating system, is mounted in a stationary base unit of the housing and the other processor is mounted to a faceplate which is detachable from the base unit. When the faceplate is attached, the first processor provides the primary control over the operating systems and the faceplate processor is subservient. When the faceplate is detached, it forms a portable RF device with the faceplate processor providing radio and communications capabilities. This system of Beckert lacks chips and remote devices.

None of the above inventions and patents, taken either singly or in combination, is seen to describe the instant invention as claimed.

SUMMARY OF THE INVENTION

Accordingly, it is a principal object of the invention to provide the consumer with easy access to the ever increasing world of information, goods, and services.

It is another object of the invention to provide the consumer with a vehicular computer system that brings the world to a consumer's vehicle.

It is a further object of the invention to provide the consumer with a vehicular computer system for vehicles that is user-friendly.

Still another object of the invention is to provide the consumer with a vehicular computer system that integrates a plethora of diverse systems and functionalities.

It is an object of the invention to provide improved elements and arrangements thereof in an apparatus for the purposes described which is inexpensive, dependable and fully effective in accomplishing its intended purposes.

The foregoing objectives are achieved in accordance with the present invention by providing an on-board vehicle computer system that allows the user to access, control, interface, and communicate (by manual intervention, touch tone, and voice response) with a broad spectrum of diverse systems and services via a graphical user interface. The on-board computer system employs an open platform operating system and an open computer architecture to achieve the maximum compatibility between the system software and the hardware; however, the on-board computer system can readily employ a customized operating system and/or a customized computer architecture to meet the specific needs and requirements of consumers.

The on-board computer system of the present invention allows a vehicle occupant to shop, order and purchase merchandise (fast food restaurants e.g. McDonald's, Wendy's, etc.), make reservations, pay for tolls, to communicate, determine geographic location, to get latest traffic information, find nearest hospital, and to ascertain weather conditions. The on-board computer system employs a distinctive touch screen display and/or manual pushbuttons and/or voice response, has the capacity to play both audio and video, has the capacity to monitor and control a vehicle's operation and features, has the capacity to provide security to a vehicle, and has the ability to connect to the Internet-TV-webtV, for example. The on-board computer system can connect to a person's home computer so that other family members can monitor the vehicle from home and/or see and talk with family members.

The operating system supports a multiplicity of applications which include entertainment, vehicular systems control, communications, navigation, and security. The on-board computer system integrates these diverse and separate systems into a user-friendly on-board computer system that allows a user virtually unlimited access to information such as making hotel reservations, request telephone numbers via yellow/white pages, products, and services. The on-board vehicle computer system of the present invention incorporates commercially available hardware, software, and services into a single package; however, customized hardware, software, and services can be used to implement the system. The on-board computer system allows the user centralized access and control of vehicle's systems and commercially available goods and services, for example, the global positioning system (GPS) can be accessed to determine the exact location of the vehicle. GPS is just one of those services and features. If a consumer connects to the Internet, the user could use the mapping conventions/directions the Web sites provide as long as it's engineered to accept touch tone, voice response and manual intervention.

The on-board computer contains the necessary hardware and software to allow a user to place telephone calls, access the Internet, and special sensors like speedpass and satellite signals, and access local cable systems, and monitor vehicular systems. The on-board computer system provides a user-friendly interface to a multiplicity of goods and services and provides a user with ready access to a broad spectrum of information, products, and services. The multi-tasking operating system allows the concurrent running of multiple applications.

The unique pop-up screen feature of the on-board computer system guides a user through the large selection of choices and controls available. The on-board computer system has multiple storage devices such as a hard disk drive, CD drive, cassette player, DVD player, or floppy disk drive. Therefore, the on-board computer can readily download programs and data from remote storage locations and readily write data to personal storage media. The on-board computer system allows for external media communications such as a laptop to communicate/display information onto the on-board computer screen. The on-board computer system can employ a single processor such as a microprocessor or can employ multiple processors. The multiple processor arrangement can involve the assignment of specific processors to run specific applications such as a digital signal processor or can involve multiple microprocessors forming a multi-processor architecture to enhance the performance of the on-board computer system. If multiple processors and multiple monitors are involved then a client/server architecture can be achieved.

Features of the on-board computer system include Internet capabilities, conference calling, CD/DVD player, built in microphone, in a location designed to hear either the passenger or driver of the vehicle, and multiple telephone lines (an automatic built-in telephone that is programmable) An insertable mobile computer chip from a mobile phone that can be inserted into the on-board computer that can be used as one of the telephone lines—this feature provides rental cars and vehicle renters the flexibility of using their own phone into the rental car to get access to the Internet and to use their cell phone convenient which expands the telephone capabilities of the on-board computer system. The necessary hardware, software, and services are provided by computer manufacturers, software vendors, mobile communication service providers, internet service providers, and cable service providers. Internet vendors and vehicle manufacturers could provide their customers with a disk containing software that is loaded into the vehicular computer which allows the vehicular computer system user to access selected Internet and vehicle/mobile communication options via select display screens, i.e. Internet companies could either organize their Web sites for touch screen and/or voice response user friendliness; car/boat manufacturers could have a disk that enables certain options purchased by the consumer.

For example, the car/boat manufacturer creates a disk corresponding to the options on the car. The dealer or manufacturer loads software options into the computer. For example, if the car is built with heated seats, then manufacturers load software options for heated seats (heated seat controls) into the computer. Alternatively, the manufacturer may have a master disk which includes all options. This master disk is inserted into the computer and the manufacturer programs the computer with the options included on the vehicle by selecting only those options.

The on-board computer is specifically sized to fit comfortably and conveniently into the dashboard of a motor vehicle such as a truck, a car, or a minivan with minimal disruption of the disposition of indicators and other instrumentation typically found in those vehicles. It also can be fit in the right location on different boats. The on-board computer is powered by the vehicle power system such as a battery or solar power or satellite or combination of all.

The on-board computer employs a touch screen with touch-sensitive pushbuttons that eliminates the need for the cumbersome, conventional pushbuttons and knobs.

The on-board computer employs voice response depending on applications used by the on-board computer such as GPS and Website voice response/activation. The on-board computer system is extremely flexible allowing a user to view DVDs, watch movies via TV and cable, access a home computer, or place a conference call. The touch screen of the on-board computer can be used in place of a laptop computer screen by connecting the laptop computer to the vehicle computer.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
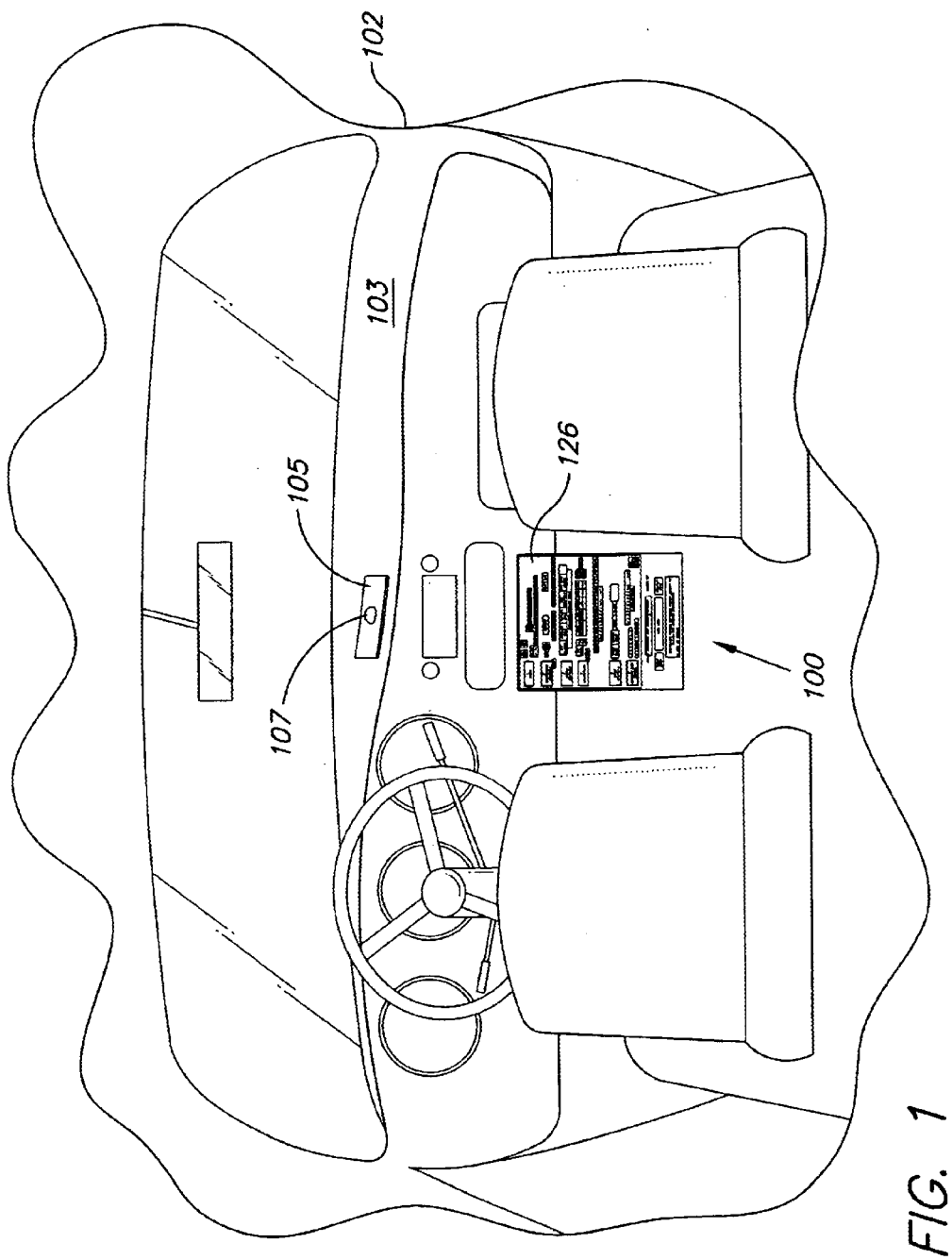
FIG. 1 is an environmental, perspective view of an on-board computer system installed in a car according to the present invention.

The present invention, as depicted in FIGS. 1–6, is an on-board computer system 100 for vehicles such as automobiles 102, aircraft 104, and boats 106, including yachts. In a preferred embodiment, the front dimensions of the on-board computer 100 are a height in the range of 4–8 inches and a width in the range of 6–11 inches. The depth of the on-board computer 100 is variable depending upon the hardware architecture employed. Any suitable hardware architecture can be used, however, an open hardware architecture is preferred. The on-board computer system 100 of the present invention unifies many heretofore independent systems into a single integrated system.

The on-board computer system 100 of the present invention is implemented using a single processor such as a microprocessor (not shown) or is implemented using a multi-processor architecture that enhances the overall performance of the computer system 100. When a multiple processor architecture is employed, the system can be implemented using one processor that controls the operation of the computer with any other processors employed being subservient or the operation of the system can be distributed among the processors wherein none of the processors is subservient. The subservient processor can be a specialized processor such as a digital signal processor.

FIG. 1 is an environmental, perspective view of an on-board computer system 100 installed in a car 102. The on-board computer 100 is conveniently disposed at a location that is easily accessible to the vehicle occupants. The computer screen 126, the main pushbutton options such as radio, Temperature Control, Vehicle Control, etc. are always lit. Other features adjunct to each pushbutton light only when the features are selected and stay on. The word "pushbutton" is lit when the pushbuttons are active.

A satellite receiver 107 may be used so the computer 100 can receive signals through a clear window 105 on the car dashboard 103. It is noted that this satellite arrangement is also appropriate with computers in other types of vehicles and can be configured in these vehicles to achieve optimum performance.

Pressing a specific pushbutton (which are shown in detail in FIGS. 4A, 4B, 5A, and 5B) changes either the shade of the screen or the entire color of the screen which notifies the user which controls are ON and which controls are OFF. This color modification feature quickly alerts the user as to which control buttons are active and which are not. In a preferred embodiment, the main menu default colors consist of a black background and the lit boxes and text is green, however, any suitable shade or color could be used for the background, for example, blue. Furthermore, any suitable color could be used for the lit boxes and text, for example, blue or amber. The color default can be modified by user.

The on-board computer is designed to have separate volume controls if the computer controls more than one display screen. The on-board computer has many pop-up screen features for selected control buttons, for example, when the connectivity pushbutton is selected and the No. Lines control pushbutton is selected, pushbuttons 1, 2, and 3 are displayed. When pushbutton 1 is selected, the five or more programmable pushbuttons are displayed (associated with pushbutton 1). There are navigation pushbuttons that allow for scrolling up or down, left or right, and next or previous screen.

The pop-up screens 126 guide the user through the system to accomplish the desired task. Only the pushbuttons for the available options appear at any given time; therefore, the screen 126 remains uncluttered and easy to read. Active pushbuttons are lit so that a user can easily tell what activities are occurring. For example, on the main menu screen 126 are displayed the six available options which include pushbuttons for radio 108, temperature controls 110, vehicle controls 112, connectivity 114, other controls 116, security code access 118. If the user selects the radio option by pressing the radio pushbutton 108, then the radio pushbutton 108 lights up and the screen 126 containing the radio options pops up. The available radio options include AM/FM band, radio preset, volume, and CD/DVD/tape/MP3. From the available options, the user selects the option they want such as mode and the following pop-up options that appear Bass, Fade, etc.

Figure 2:
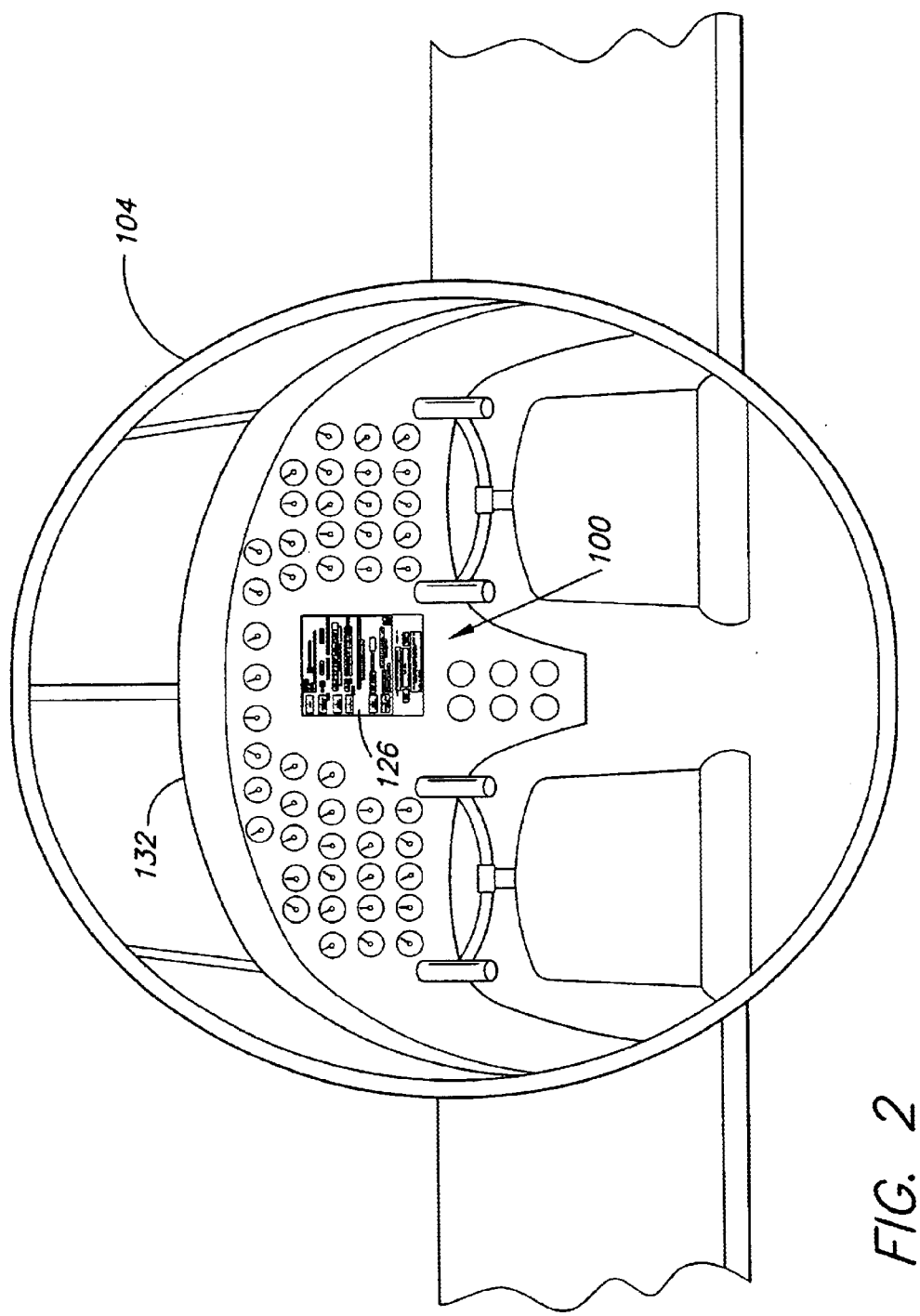
FIG. 2 is an environmental, perspective view of an on-board computer system installed in an airplane.

FIG. 2 is an environmental, perspective view of an on-board computer system 100 installed in an airplane 104. The on-board computer 100 is disposed within the cockpit 132 in the location shown in FIG. 2 making the on-board computer 100 easy to reach without disrupting the normal arrangement of the instrumentation. This implementation of the on-board computer 100 has its own set of control pushbuttons geared to the specific needs of someone flying an aircraft 104, for example, one of the primary options is a navigation pushbutton that makes available numerous navigational options such as wind speed and directionals (altitude and longitude).

Figure 3:
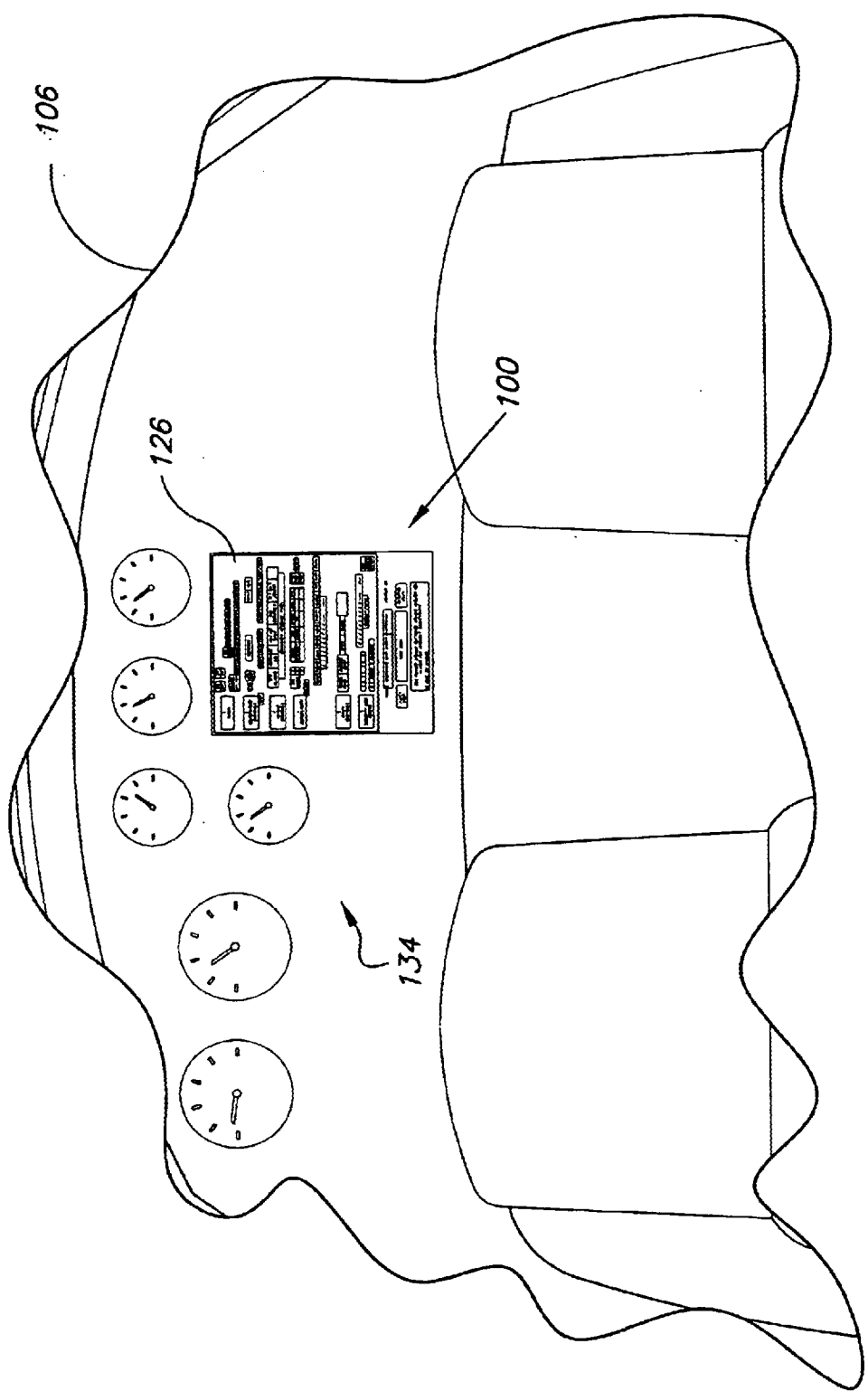
FIG. 3 is an environmental, perspective view of an on-board computer system installed on a boat.

FIG. 3 is an environmental, perspective view of an on-board computer system 100 installed on a boat 106. The on-board computer 100 is located either in one of these locations—depends on the boat model, for example: On a sailboat this computer would be housed below deck with the rest of the controls 134 (as in FIG. 3); on a yacht, the computer would be located with all the main controls of the yacht, usually above deck, located around the helm. In this implementation, control options used for cars and boats are somewhat different (the differences are highlighted in the discussion of FIGS. 5A and 5B, below). The on-board computer controls can be designed to alter the main controls to fit the vehicle purpose, for example, the GPS navigational system includes a GPS navigational map system that is used to plot the boat's course. This implementation also has a set of control pushbuttons geared to the specific needs of someone navigating a boat 104, for example, a map plotter pushbutton that enables the user to plot the boat's course.

Figure 4A:
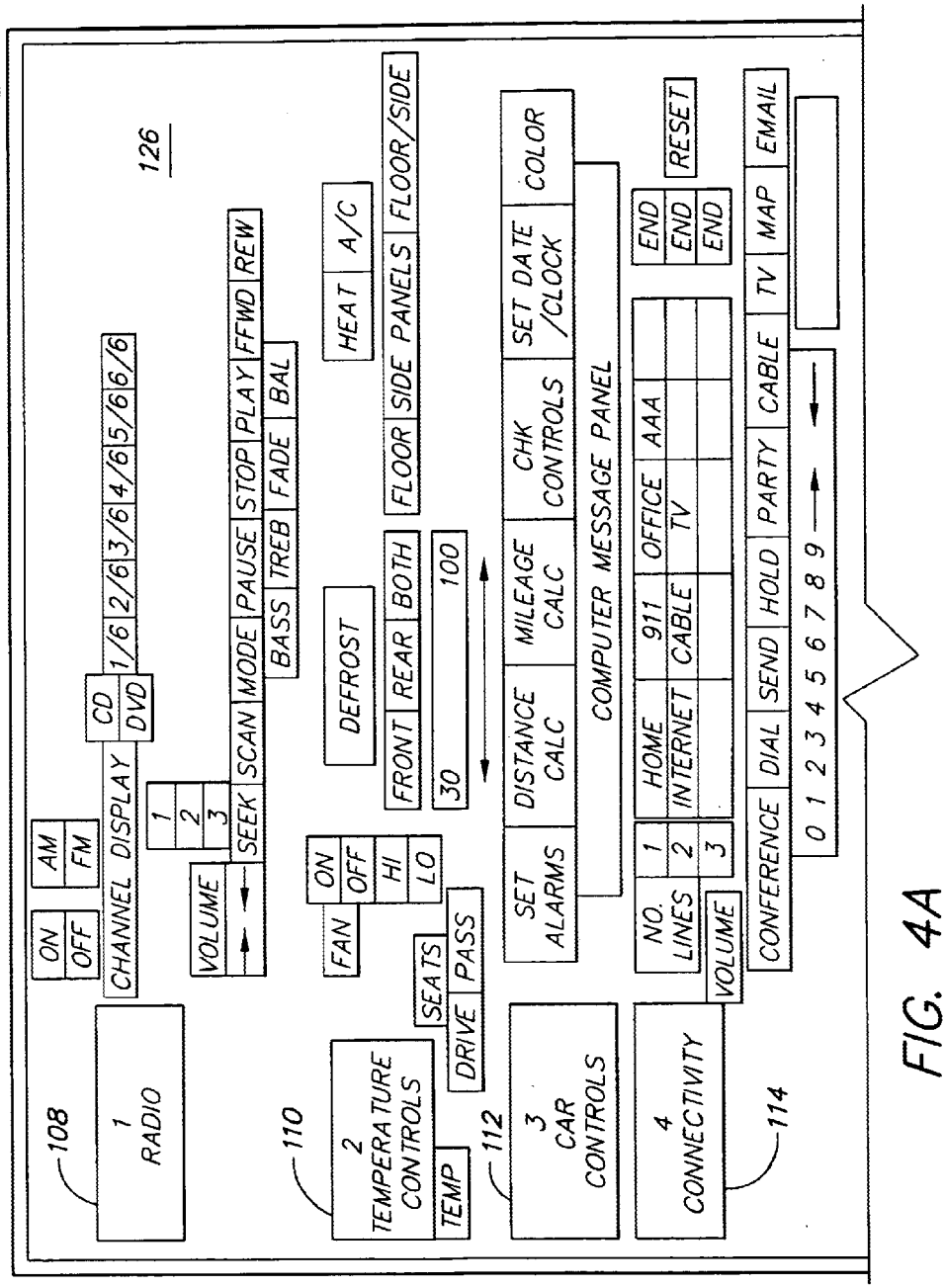
FIG. 4A is a front view of the upper portion of the display screen of the on-board computer system of a car displaying various features and functionalities.
Figure 4B:
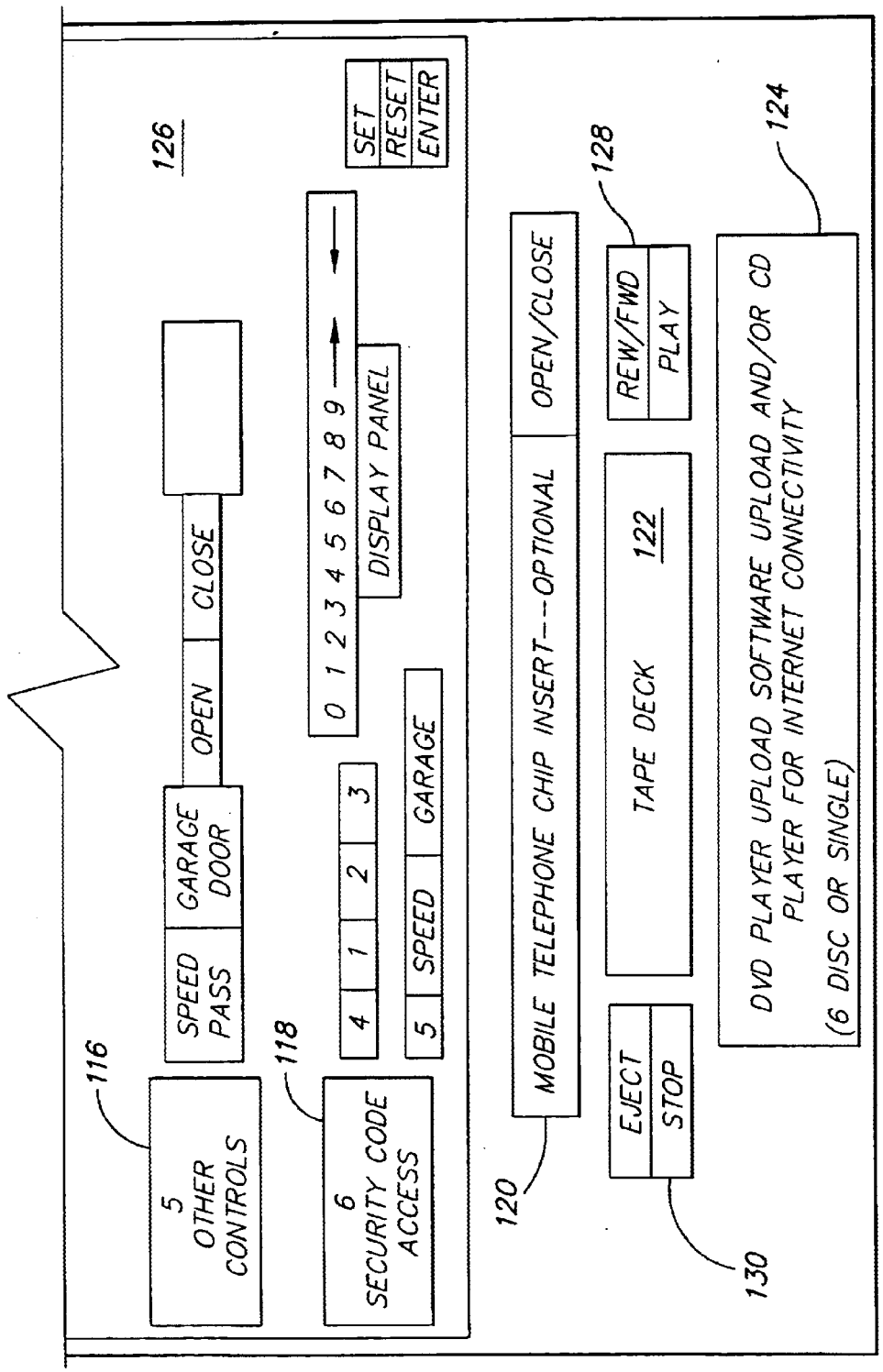
FIG. 4B, which is a continuation of the screen in FIG. 4A, is a front view of the lower portion of the display screen and the bottom portion of the on-board computer system of a car showing the locations of the various hardware devices.

FIGS. 4A and 4B show a representative sample of the large number of pushbutton selections available to a user (the sample is a diagram for a car); however, the selections can change when the on-board computer is for a boat or an airplane. The pushbuttons are shown in the arrangement depicted in FIGS. 4A and 4B are for purposes of illustration only. FIGS. 4A, 4B, 5A, and 5B show the large selections of options available to the user, however, only the options associated with a selected control button, such as the temperature control pushbutton 110, are actually displayed on the pop-up screen 126.

FIG. 4A is a front view of the upper portion of the display screen of the on-board computer system and FIG. 4B is a front view of the lower portion of the display screen and the bottom portion of the on-board computer system showing the locations of the various hardware drives. Collectively, FIGS. 4A and 4B show a front view of the display screen and the locations of the various hardware devices. With reference to FIGS. 4A and 4B, the following is a detailed description of the main menu computer screen.

PUSHBUTTON 1 108—RADIO/CD/DVD CONTROLS—the radio has an On/Off pushbutton. When the On pushbutton is selected, the radio is active by default; to get the CD operating, the CD/DVD pushbutton must be selected. Pressing the Off pushbutton deactivates the radio and CD/DVD/tape/MP3 controls.

A: AM/FM BAND PUSHBUTTONS—the selected pushbutton lights up to indicate which band was selected. Either band can be playing simultaneously with the CD/DVD because of the dual speaker system.

B: RADIO PRESET PUSHBUTTONS—adjacent the AM/FM pushbuttons are 6 preset programming and reprogramming pushbuttons. These pushbutton keys display in a digital format. The preset keys work for the radio and CD/DVD player. The exact configuration of the preset keys is determined by the specific design of the on-board computer system, for example, in a vehicle with an on-board computer that has a single disc player, the preset keys have one configuration while in a vehicle with an on-board computer that has a multiple disc player such as CD changer, the preset keys have a different configuration. To set a radio station, the user tunes into the radio station using the tuner/frequency arrow keys they want to hear and pushes a preset pushbutton for about 1 or 2 seconds until a beeping sound occurs. Each preset pushbutton operates in the same manner. When the DVD is playing, via movie, the system clears the main on-board computer menu and goes to a second screen. The function keys on this screen to control the DVD are disposed at the bottom of the screen. The pushbuttons that work with the radio are: seek, scan, mode (bass, treble, fader, and balance). Directly beneath the AM/FM band is the area where the radio station frequency displays (identified as channel display in FIG. 4A) in digital format.

C: VOLUME PUSHBUTTON:—this pushbutton controls the radio, CD/DVD, (telephone volume, if applicable) and tape player. When the volume pushbutton is selected, the volume positioning and speaker adjustment pushbuttons pop-up in digital dialog as 1, 2, and 3. Either numbers or names can be placed on the pushbutton but for description purposes, numbers are described. When either 1, 2, or 3 is selected, the volume positioning display control appears where the volume can be adjusted to the user's preference. 1 controls and adjusts the front speaker, 2 controls and adjusts the rear speaker, and 3 controls and adjusts both speakers. When either 1 or 2 or 3 is selected, the volume position (H→...........←L) can be adjusted by the system. The system automatically defaults to 3 when no volume pushbutton is selected. The letter H means high volume and the letter L means low volume. The arrows are used to lower and increase the volume. When the arrow pushbutton is selected, the volume is adjusted in the direction of the arrow. Continuously pressing an arrow lowers or increases the volume to the user's preference.

Directly beneath the volume controls 1, 2, 3 frequency digital display are the seek and scan and mode pushbuttons. When either the seek or scan or mode is selected, the pushbutton lights up and stays lit until either the pushbutton is pressed again which deactivates the controls or by the system default after a few seconds the pushbutton is deactivated.

D: CD/DVD PUSHBUTTON—when the CD pushbutton is selected, the radio turns off and the CD player turns on. The CD pushbutton lights up and disc selection pushbuttons appear. If a disc selection pushbutton is not selected, the CD changer searches for a CD until it finds the first CD and once it finds the first CD, it starts playing that CD and the numbered disc pushbutton illuminates (a darker brightness color than the screen). If a number is selected (the disc selection pushbuttons correspond to the preset numbers used for the radio), the disc in the numbered slot of the CD changer starts to play. The disc selection pushbuttons are only active provided the on-board computer has a CD player capable of holding multiple CDs. On the screen, directly adjacent to the arrow keys is displayed in digital format the disc number and the track.

The on-board computer system can have either two or three screens. Screen 1 is the main menu of the on-board computer, screen 2 appears when either the DVD pushbutton or the connectivity, conference call or Internet features are selected. Screen 3 is the screen in the back of the vehicle, i.e. a car where the passengers can watch the DVD. Screen 3 can also be referred to as the screen used by the airplane where the passengers can watch the DVD (a big screen in the center aisle or a screen on the back of the seats of a plane) being played by the main on-board computer.

Pause works for the entire radio and connectivity sections, i.e. when a cellular call is received, the Pause pushbutton can be selected to answer the call.

The DVD/CD/MP3 stops playing either when the user presses either the stop or pause pushbutton, or when the DVD stops automatically because it has finished. Once the DVDs have finished playing, the user presses the PREV pushbutton on the bottom panel of the screen to return to the main menu and the computer turns screen 2 or 3 off. When the vehicle has two computer screens, when the DVD pushbutton is selected, a pop-up menu appears where the operator can select screen 1, screen 2, or screen 3. If the number 3 is selected, the radio or other features can be on at the same time that the DVD is appearing on the rear screen with the radio pushbutton options appearing on the front screen. The pushbuttons that work with the CD and DVD are STOP, PLAY, F.FWD (fast forward), REW (rewind), PAUSE, and SCAN. When these options are selected, all of these function keys are active.

E: Stop—stops CD or DVD from playing, fast forwarding, rewinding, or scanning.

F: Play—starts playing the selected CD or DVD disc. When this pushbutton is selected, it lights up.

G: F.FWD—controls fast forward for both DVD and CD. When DVD/CD is in operation, the CD activates the track search mode. By pressing forward, the disc advances to the next track. The button can be repeatedly pressed until the last track on the disc is reached.

H: REW—controls rewinding the DVD and CD. When a DVD is in operation, the Stop button should be pressed first before pressing the rewind button to perform its function, however, when a CD is playing, pressing the rewind button activates the track search mode which moves the disc from the present track to the previous track. Pressing and holding either the G (F.FWD) or H (REW) pushbuttons causes the disc to move either forward or backward through the tracks until the beginning or the end of the track is reached.

I: PAUSE—pressing the pause pushbutton temporarily stops (about 3 minutes) the radio, CD, and DVD. When the pause pushbutton is selected, it lights up and stays on until it is pressed again which cancels the function or when the 3 minutes is up, it automatically goes back on. If the user receives a telephone call while listening to the CD/DVD/tape/MP3 disc or radio, the pause button under the connectivity is activated automatically upon the user answering the call. The pause pushbutton is lit and remains lit until either the user hangs up or the button is deactivated by the user. During the call, all but one designated speaker for receiving calls are muted for the DVD/radio/tape/MP3 automatically and the mute pushbutton is lit; the mute stays in position until the pushbutton is deactivated by the user or when the user hangs up. When the mute pushbutton is deactivated, the speakers go back to previous settings and can be adjusted as designed. When the user is playing a DVD movie or watching TV (via webtv) or on a conference call, the 2nd screen is activated. Whatever activity was muted, it automatically gets reactivated.

J: SCAN—the scan function works with the radio and CD/DVD player. When the scan pushbutton is selected, the pushbutton lights up. When a CD is playing, the first part (approximately 15 seconds) of each track on the current disc is played. By pressing the scan pushbutton again, scanning stops and the track playing continues to play. When scan is used for radio, the system tunes into each strong frequency pausing for ten seconds. By pressing the scan button again stops the pausing and causes the station selected to stay on displaying the radio frequency of the station.

K: MODE PUSHBUTTON—when this pushbutton is selected, the system displays a pop-up screen that displays BASS, TREBLE, FADER, and BALANCE control pushbuttons. These pushbuttons are used for the speaker system of the vehicle. The mode pushbutton works for the radio, CD, DVD, tape player, telephone, and internet features provided there are sounds available. When the Bass pushbutton is selected, the pushbutton lights up and the following is displayed:

(–→.................←+).

By pressing the arrow keys, it adjusts the bass in the direction of the arrow, by continuously pressing an arrow, it decreases or increases the bass to the user's preference. After a few seconds of the adjustment, the bass pushbutton disappears. If no other selections are made, the pop-up screen automatically disappears. When the treble pushbutton is selected, the same display and functionality as the bass pushbutton occurs. Both the bass pushbutton and the treble pushbutton work exactly the same way.

When the fader pushbutton is selected, the following is displayed:

(→//////////////////←).

Pressing the arrow keys adjusts the control. The arrow pointing to the right is the rear and when that arrow is pressed, it moves the fader towards the center. The arrow pointing to the left is the front and when that arrow is pressed, it moves the fader towards the center. A few seconds after an adjustment is made, the fader pushbutton disappears.

When the balance pushbutton is selected, the following is displayed:

(⇆.................⇆).

When the arrow pointing to the right is pressed, the balance moves away from the rear and towards the center. When the arrow pointing to the left is pressed, the balance moves away from the front and towards the center. A few seconds after the adjustment is made, the balance pushbutton disappears.

If there are two screens in the vehicle, a pop-up screen display allows the user to select option 1 or 2 or 3. When either option 1 or 2 or 3 are selected, the speaker control pushbutton lights up.

PUSHBUTTON 2 110—TEMPERATURE CONTROLS—when this pushbutton is selected, the computer displays the following:

A: TEMPERATURE—when this pushbutton is selected, the outside temperature is displayed. When the temperature outside is below 37.5 F. (3 C.) a chime sounds and the unit of measurement is flashed for a predetermined amount of time such as 10 seconds. When the pushbutton inside or outside is selected, the temperatures are displayed. To change internal control temperature, by pressing the key more than one second, the thermostat pops up.

B: FAN, ON/OFF—when the ON pushbutton is selected, the FAN (blower) pushbutton is available. The OFF pushbutton is used to shut off the fan. When the ON pushbutton is selected, the pushbutton lights up and a pop-up digital display appears with speeds 1 through 5. 1 is the slowest speed and 5 is the fastest speed. Either the defrost or the heat or the A/C pushbutton must be selected before the 1 through 5 fan speeds can be selected. The defrost, the heat, and the A/C pushbuttons light up when selected (the rear pushbutton can be selected without fan speed). When the defrost, the heat, and the A/C are selected, the following pop-up pushbuttons (the defrost and heat features can be used simultaneously) are displayed:

C: DEFROST

Front—when this pushbutton is selected, the pushbutton is lit and air blows out onto the front windshield.

Rear—when this pushbutton is selected, the pushbutton is lit and heat is applied to the rear window.

Both—when this pushbutton is selected, the pushbutton is lit and air blows out onto the front windshield and heat is applied to the rear window.

D: HEAT

Floor—when this pushbutton is selected, the pushbutton lights up and the air is blown onto the floor.

Side Panels—when this pushbutton is selected, the pushbutton lights up and the air is blown from the side panels.

Floor/Side—when this pushbutton is selected, the pushbutton lights up and air is blown onto the floor and from the side panels.

Seats—When the seats pushbutton is selected, the computer pops-up the Passg. and Driver, and low and high pushbuttons. When either of these pushbuttons are selected, Low or High pushbuttons can be selected. When these pushbuttons are selected, they light up. Both the passenger and the driver pushbuttons can work simultaneously. The computer has a timer on the Low/Heat heat duration. After 3 minutes or so, the function is deactivated automatically. To deactivate these options either the user deselects the pushbutton or computer automatically shuts off the features.

E: A/C—the same features described in the above section with the exception of seat features are used with A/C.

F: HEAT/AC TEMPERATURE CONTROL—This control adjusts the temperature for the Heat and A/C controls. The display control can be adjusted by the arrow keys. When the L arrow is selected, it decreases the temperature and when the R arrow is selected, it increases the temperature. The min. temperature is 30 and the max is 100. When the positioning of the arrow is decreased or increased, the computer indicates temperature in digital format and heat and A/C is adjusted based on desire temperature When the positioning stops, the temperature degree appears on the screen for about 1 minute then disappears.

PUSHBUTTON 3 112—CAR CONTROLS—the pushbutton displays what the vehicle manufacturer chooses as options for the vehicle. These options could possibly be controlled and programmed by each vehicle manufacturer, for example, FORD and BMW car manufacturers have different car controls. Besides car manufacturers yacht and airplane manufacturers have control to change features and options as desired. A disk is inserted in the vehicle computer to program the types of controls available. Once these features are loaded into the computer, the computer should be able to adjust some of the features for example set alarming and security features. These features can be changed by using the reset pushbutton on the numbered panel. Options as the date and clock can be reset in the Vehicle Controls section. A numbered digital panel is used to change the settings for most of these vehicle controls, i.e. the clock and date involves using the reset pushbutton of the numbered panel.

The vehicle controls consists of some or all of the following:

A: AVERAGE SPEED—display the average speed in digital format.

B: RANGE—displays in digital format the estimated distance with the remaining fuel. When the fuel falls below a predetermined amount of fuel the system chimes as a warning and displays in the message panel. After the initial chime, the system chimes every couple of minutes until the vehicle is refueled.

C: AVERAGE FUEL CONSUMPTION/MILES—this display the miles per gallon. The system resets this parameter each time the vehicle is refueled.

D: TIME TO DESTINATION—an estimated time based on mileage to be traveled. The estimated time is displayed by entering the number of miles to travel and the system computes the estimated time of arrival at the destination.

E: SPEED LIMIT WARNING—a speed limit is programmed (by the vehicle operator) into the system and when that speed is approached, a chime warns the driver. If speed increases again and passes the programmed speed, the system chimes again warning the driver. The speed then goes to the mph programmed into the system.

F: CLOCK AND DATE—this option changes the time and date. The Clock and Date displays on the main and 2nd screen. To reset the date or time, when either of these pushbuttons are selected, a separate pop-up menu appears directly underneath the main option. An arrow adjustment panel appears L<. . . .>R. When the L arrow is selected, the user can position the arrow under the number wanting to change, when positioned directly underneath the number to be changed, the arrow positioning must stay in position for about 30 seconds, a beep sounds informing the user that a new number can be entered. The user has 45 seconds to enter a new number before a second beep sounds. This informs the user that the change has been made. These features stay on the screen until either pushbutton have been deactivated by the user or after 2 minutes, when the system automatically deactivates them. (When the date and time feature is activated the number panel in Connectivity section activates so the user can select the number to change date and time.)

G: SPEAKER CONTROL—this option allows the user or the manufacturer to program two separate speaker systems provided the on-board computer system has more than one speaker system. The separate speaker system allows two speakers working simultaneously or separately.

H: COLOR CONTROL—when this pushbutton is selected, the system displays a pop-up digital menu to adjust the color of the screen or screens, for example, screens 1 or 2 or 3. For vehicle computer system having two physical—front and rear—screens, the number 1 controls the main computer screen, the number 2 controls the rear computer screen, and the number 3 controls both the main computer screen and the rear computer screen.

When selecting either or both screens, a color chart appears that allows the color frequency of the screen to be adjusted. The user selects from this menu a variety of screen characteristics, for example, the background, foreground, and text. When a background is selected, the user must select a color. Arrow keys are used to A) select colors desired for the background, foreground, and text, B) control the brightness and intensity of the color selected.

I: CHECK CONTROLS—any malfunctions that occur are displayed right below the pushbuttons of this section notifying the user of the malfunctions. When malfunctions occur or when the check control pushbutton is selected, the malfunctions and control status appears in the Computer Message Panel shown in FIGS. 4A, 4B, 5A, and 5B.

J: SET ALARMS—if a vehicle has an alarm system, it is set here or by using the OTHER CONTROLS PUSHBUTTON 5.

K: COMPUTER MESSAGE PANEL—As described in the Check Controls Section, this feature displays vehicle or computer malfunctions, warnings, and status either by user interaction or system performs automatically (automatically when there's a malfunction or vehicle warning.)

PUSHBUTTON 4 114—CONNECTIVITY—this section controls the mobile telephone, internet access, cable access, conferencing, and TV connections. Depending upon the particular configuration of the on-board computer system, the computer is capable of handling two, three, or more separate telephone lines.

A: LINE PUSHBUTTON—Depending on the number of separate cellular numbers the user has programmed into the computer, 1 or all 3 lines can be used simultaneously. When a line pushbutton is selected, the pushbutton lights up and the following pop-up menu appears:

Line 1: Option 1, Option 2, Option 3, Option 4, Option 5
For description purposes, the pushbuttons have been labeled as Option 1, Option 2, Option 3, Option 4, and Option 5. These options are where the user is able to store five or more telephone numbers per mobile telephone line. The pushbuttons actually only show 1 2 3 4 5. However, for example, when Line 1, Option 1 is selected, the telephone number stored to the line displays in place of Option 1. If the user wants to store a number, the number pushbutton is selected and pressed for about a second until a beeping sound occurs. The user keys in the telephone number using the telephone number panel below the Conference, Dial, and Send pushbuttons (the number is displayed on the panel).

As an example of the safety and security of the instant invention, it should be noted that 911 (or other emergency number) can be stored in memory and activated in case of emergency. It is further noted (as an example of an external event which can control connectivity) that this safety feature can dial 911 if the vehicle is obstructed externally, e.g. in an accident.

After keying in the telephone number, the option key is pressed again to accept the number. This procedure is repeated for all of the option buttons. When a telephone number is selected such as option 1, the computer automatically displays the telephone number in the display panel. To place a call, the user must either press a stored telephone number or enter a telephone number and then press the Dial and Send pushbuttons. When an option pushbutton is selected and a stored number is retrieved, the system automatically dials the number. The user must press the send pushbutton to send the call. In one embodiment, the number is automatically dialed by the computer while in a second embodiment, the user must press the Send pushbutton. The Dial and option number pushbuttons are lit until the END pushbutton is selected which disconnects the telephone line. Depending upon the number of lines programmed into the system, there are as many End pushbuttons as there are lines.

For an incoming telephone call (a further example of an external event), the line number on the main menu flashes and a ringing sound is produced. The ringing sound is identical to a normal telephone ring. To answer the telephone call, the user presses the line number flashing on the panel. To end the call, the user presses the End pushbutton.

An on-board computer system having three different mobile telephone lines is given as an example. Lines one, two, and three have five programmable store function keys. Line 1 is programmed for home and office use, Line 2 is programmed for TV, cable, and Internet connectivity. When the Internet pushbutton option is selected, the telephone number programmed or stored for this option is displayed on the panel and the user must press the Dial and Send pushbuttons. The computer can either use a telephone line to access the Internet or use a straight satellite, depending on how the device is engineered. At this point, the system clears the screen and the screen 2 appears. This screen includes features for the Internet, cellular phone, etc. At the bottom of the screen is a connectivity symbol indicating the strength of the signal. In another embodiment, color bar codes are used to indicate the strength of the signal. The more lines towards the larger end of the connectivity symbol the stronger the connectivity. The bar code lines toward the smaller end of the connectivity symbol indicate a weak connectivity and notify the operator by the system's flashing the symbol indicator.

B: CABLE PUSHBUTTON—when this pushbutton is selected, the system connects to cable via the telephone line used for cable connectivity. The system clears the screen within a few seconds. The connectivity is via a programmed mobile telephone number.

C: CONFERENCE PUSHBUTTON—one of the telephone lines must be selected and active before this pushbutton is active. When a user is placing a conference call, the user must press a mobile telephone line and programmed option (stored telephone number) or enter a telephone number and press the Dial and then the Send pushbuttons. Once the connectivity occurs, the conference pushbutton can be selected and another telephone number can be entered repeating the above procedure. After a few seconds, the system clears the screen and the 2nd screen appears (see FIG. 6). When the conference pushbutton is selected on this screen, the conference call is establish via a satellite link. To end the conference call, the END pushbutton is pressed and within a few seconds, the main system menu appears and mobile line's disconnected. The on-board computer encompasses a small camera to provide conferencing. When a call is received and the user wants it to be conferenced, the user must press the conference pushbutton on the main menu and on the second screen.

D: PARTY PUSHBUTTON—the user must first be connected to another telephone line before this feature is active. The user must first press the party pushbutton to connect to a party line. The current line in use must be placed on Hold for the user to enter a telephone number by using the number key panel provided. Once the telephone number has been entered, the Dial and Send pushbuttons must be selected. When the call is connected, the user deselects the Hold pushbutton. At this point a party line is established and the party pushbutton is lit along with the telephone number displaying on the number panel. This process can be repeated only if the manufacturer allows dual party lines. To disconnect the party line, the Party pushbutton is deselected and the party pushbutton light goes off. This does not terminate the call established before Party option was selected. To disconnect a line(s), the End pushbutton should be depressed.

E: HOLD PUSHBUTTON—this function key is used to conduct party line calls and to answer another telephone call. For a party line, the user must be connected to a mobile line and to connect to another telephone line, the user presses the party and then HOLD pushbutton which lights up. For example, when a user is currently on a line, the user selects Hold then Party and then selects E another line using the number panel to put in the telephone number being called or using a pre-programmed line. The user then presses the dial pushbutton and then the send pushbutton. When the call is answered, by pressing the hold pushbutton again, it establishes a party line. The hold pushbutton light does not go off until the Party line is disconnected and the user deselects the Hold key or the connection gets disconnected.

To answer a telephone call while already on a line, the user presses the Hold pushbutton and then presses the flashing pushbutton of the mobile line to receive the incoming call. The Hold pushbutton places the call on hold until either the signal weakens to the point where the connectivity ends or the Hold pushbutton is pressed again. Otherwise, to receive a call just press or speak the line flashing to accept the call.

F: MAP/DIRECTIONS PUSHBUTTONS—a map computer provides directions via the global positioning system or directions are provided via the Internet through the line in connectivity section 114.

G: DIAL PUSHBUTTON—this pushbutton actually dials the telephone number the user selects via preset numbers of entered telephone number. When selected, it starts the connectivity process. This pushbutton is used for all numbers stored in lines 1, 2, or 3 or manually entered and displays in the number panel.

H: SEND PUSHBUTTON—when this pushbutton is selected, the number in the dial panel or the option telephone number selected is processed for connectivity.

I: SELECT NUMBER DISPLAY PANEL—this panel is used to select a number. When a number is selected on the panel, the number displays directly to the right of the panel. If the user needs to change a number, the user uses the arrow pushbuttons to go either forwards or backwards to locate the number to be erased. To erase a number, the user places the arrow directly beneath the number and holds it there for a predetermined amount of time such as a second. The number disappears which allows the user to enter a new number.

J: DISPLAY NUMBER PANEL—this panel displays the manual number to be dialed into the computer. If a stored number from the line option section is selected, the number appears on the panel. When another number is selected from the pre-programmed, voice activated, or manual number being entered, the system clears previous number and displays the number being dialed.

K: END PUSHBUTTON—these pushbuttons are used for disconnecting the mobile telephone lines. Each telephone line has an End pushbutton; this feature allows for multiple calls simultaneously.

L: RESET PUSHBUTTON—this pushbutton is used to reset a preset telephone line. To reset a telephone line, select the telephone line; the old number appears and by selecting Reset pushbutton the number is deleted. To select and store a new number the user enters the new telephone number via the number panel feature and the reset pushbutton is selected.

M: VOLUME—if the manufacture cannot control the speaker system and telephone speaker feature in the radio section, then a volume pushbutton option is available in this section. This pushbutton controls the volume to the telephone line(s). The volume feature is designed just like the one in the radio section except the user would need to press the line pushbutton first before adjusting the volume. For description purposes, 3 separate pushbuttons appear in this section because of three mobile telephone lines.

PUSHBUTTON 5 116—OTHER CONTROLS—this part of the computer operates additional features that vehicle manufacturers build into the vehicle. These programmable features are selected as options when a consumer purchases the vehicle. These features are uploaded via a disk into the computer and a security password activates both the features and the feature's pushbuttons. Some of these features include devices such as a speed pass, a garage door opener, and home sensor security systems. A small, clear window covered with clear glass is disposed on top of the vehicle dashboard that activates the speedpass, a garage door opener, and home security systems, for example, the garage door opener is activated a certain distance from the garage door. These devices are installed based on current technology and future technological improvements.

A: SPEEDPASS—to activate the speedpass, which is used for paying tolls, the Vehicle Identification Number (VIN) is used as a security sign-up with the company that activates the feature.

Figure 8:
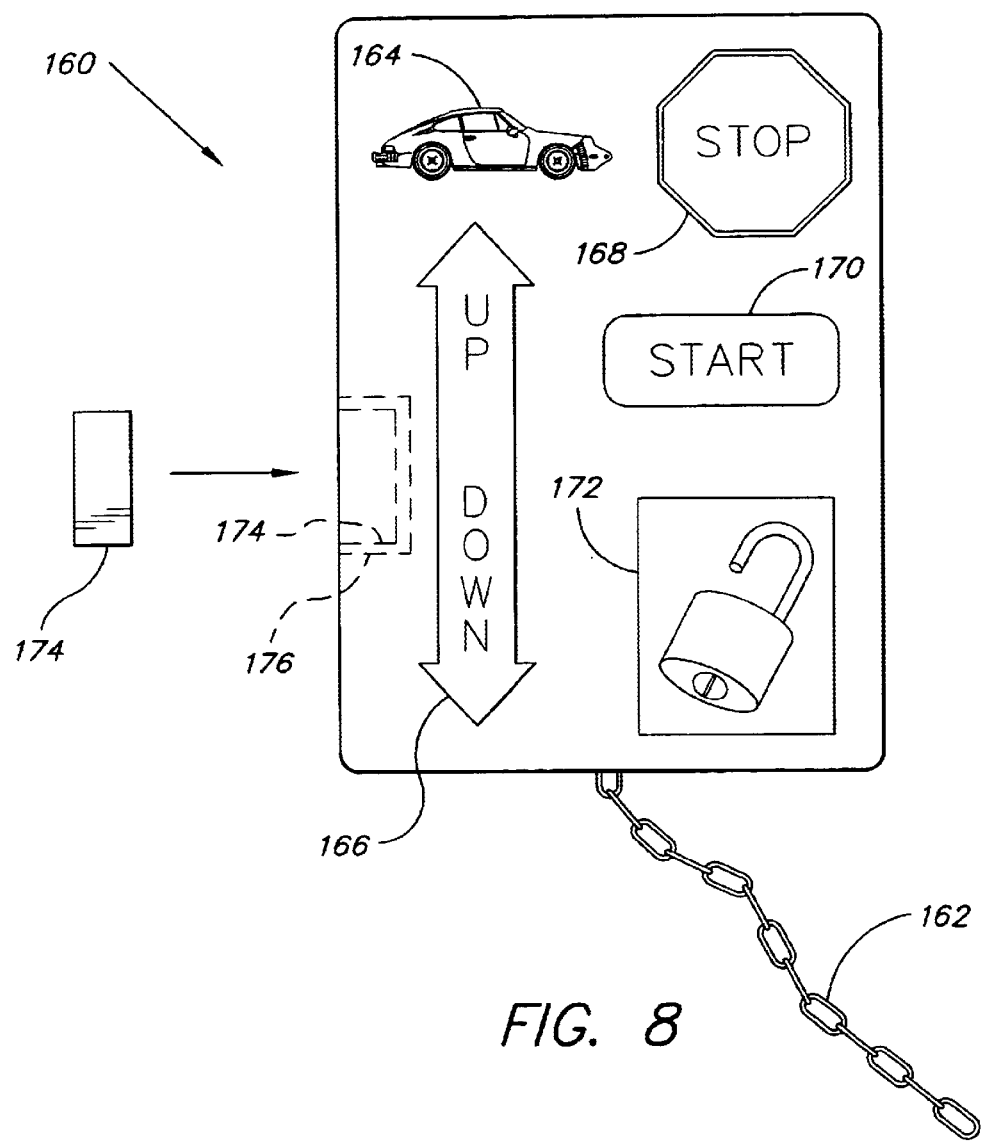
FIG. 8 is a view of a multi-function remote control for use with or separately from the on-board computer system.

B: GARAGE DOOR OPENER—the garage door sensory system is operated by the device reading the VIN through the dashboard screen. An access code is programmed into the garage door device and the vehicle computer. Both the garage door device and the vehicle computer convert the access code into a barcode. The barcode number activates the garage door opener device and when the Open/Close pushbuttons are selected on the computer and/or manual devices, the Open/Close pushbuttons give a number or code such as the VIN number to the garage door sensory system such as a laser scanned system which opens and closes the garage door. More than one VIN number can be programmed into the garage door opening device and the vehicle computer. The garage door opener has a backup device that the consumer uses to manually open and close a garage door. The manually operated device works very much like the lock/unlock mechanism conventionally used for locking and unlocking vehicle doors (as shown in FIG. 8).

PUSHBUTTON 6 118—SECURITY—this function allows the vehicle owner to set passwords for the Connectivity and Other Controls sections of the computer, for example, the speed pass, the garage door opener, the home security system, and the telephone system. The password consists of from 1 to 10 bytes. When the security pushbutton is selected, it lights up and the following pushbuttons are displayed:

A: PUSHBUTTON NO. 4 AND PUSHBUTTON NO. 5—the user has the choice of securing certain portions of the computer such as sections 4 and 5. When the user chooses to secure section 4, the pushbutton labeled 4 is selected. When selected, the pushbutton labeled 4 is illuminated. When the user chooses to secure section 5, the pushbutton labeled 5 is selected. When selected, the pushbutton labeled 5 is illuminated. When either pushbutton is selected, the number code panel is displayed along with set and reset pushbuttons. Both pushbuttons can be selected, either one at a time or at the same time, and security codes assigned to both.

Sections 4 and 5 can have separate security codes which allows the vehicle owner greater flexibility and security. The user sets one or more passwords by function or sets one password for all functions, for example, to set a password for pushbutton 4, the user selects pushbutton 4, then pushbuttons 1, 2, 3 (lines 1–3 correspond to the mobile lines in Section 4), or all pushbuttons. The user keys in the password by using the number panel (the number appears in the display panel), then the user presses Enter and then presses the Set pushbutton. When the Enter key is pressed, the number appears for a predetermined amount of time, such as 60 seconds, then automatically disappears.

C: SECURITY NUMBER CODE PANEL—this panel allows the user to set security codes for pushbuttons 4 and 5. A numbered panel that is numbered 0 through 9 displays. When a number is selected on the panel, directly to the right, the code number entered is displayed. To set the code number, the user presses the Set pushbutton. To change the number, the user must first enter current password and then press the reset pushbutton which erases the current security code. If a number is incorrectly entered, system displays error message and the arrow pushbuttons when pressed move forwards or backwards to the number the user wants to erase. To erase the number, the user places the arrow directly beneath the number and holds it for a predetermined amount of time, such as a second. Once the number is erased, the user enters a new number directly in that location or uses the arrow key to move to another location. The min and max security code is up to the manufacturer.

D: SET PUSHBUTTON—when the user has finished entering the security code, the set pushbutton is selected and the password is set when a beep sounds.

E: RESET PUSHBUTTON—when the user selects the reset pushbutton, it erases the security code for the features sections 4 and 5. For example, the user selects pushbutton 4, then selects line 2, the computer requests a password, the request is displayed beneath the display panel. The user enters the password by entering the number and then pressing the ENTER pushbutton; system validates and displays message as on panel as such: Enter password, password accepted or denied. When accepted, a new password can be entered, the user presses the reset key and the computer erases the current password code. Before the user is able to reset the current password, the user must enter in the current password, then reset. If the current password was not entered into the computer, it will not reset the password.

F: ENTER PUSHBUTTON—this pushbutton is used to enter in the current password assigned to a feature or features. When a code is assigned to a certain feature or features, the user must use this function to activate the feature. Once the number is keyed and displays on the display panel, the Enter pushbutton is selected.

SECURITY FUNCTION—setting more than one security code for each featured pushbutton in sections 4 and 5 works as follows:

While the user is in Section 6 (Security Section), when either 4 or 5 is selected, a list of all the functions under each section is displayed. If the operator wants to set one security code for all features, the user presses the pushbutton of all features. If a separate code is desired for all features, a combination of features, or simply one feature, the feature pushbutton is selected and the process explained above in setting security codes is followed to set the security code.

Figure 9:
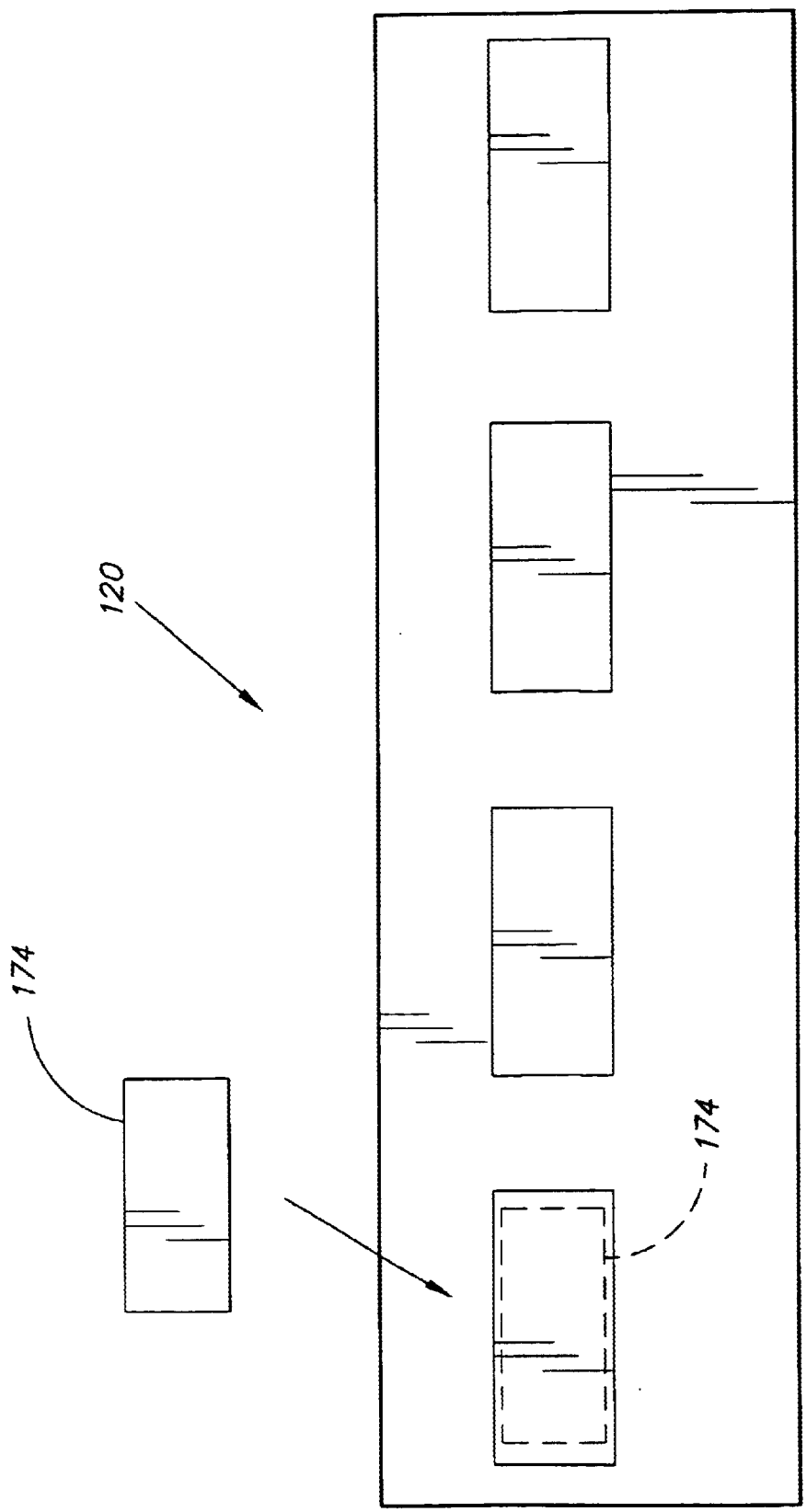
FIG. 9 is a view of a chip insert bay which is integral with the on-board computer system and utilized for operation of the remote control and other features.

The lower portion of the on-board computer 100 houses the storage devices and drives such as an optional chip insert bay 120 (discussed more fully in reference to FIG. 9), a tape deck 122 and DVD player 124 used by the on-board computer 100. The DVD player 124 is also used as a CD/DVD drive for receiving uploads for programming the computer 100, e.g. from the disk 136 (shown in FIG. 7) created by the manufacturer based on the options in the vehicle. Manual controls such as FWD (forward) 128 and STOP 130 are located adjacent to the tape deck. FIGS. 4B and 5B (discussed below) also show the location where the chips controlling certain features is inserted if such a chip is part of the implementation.

Figure 5A:
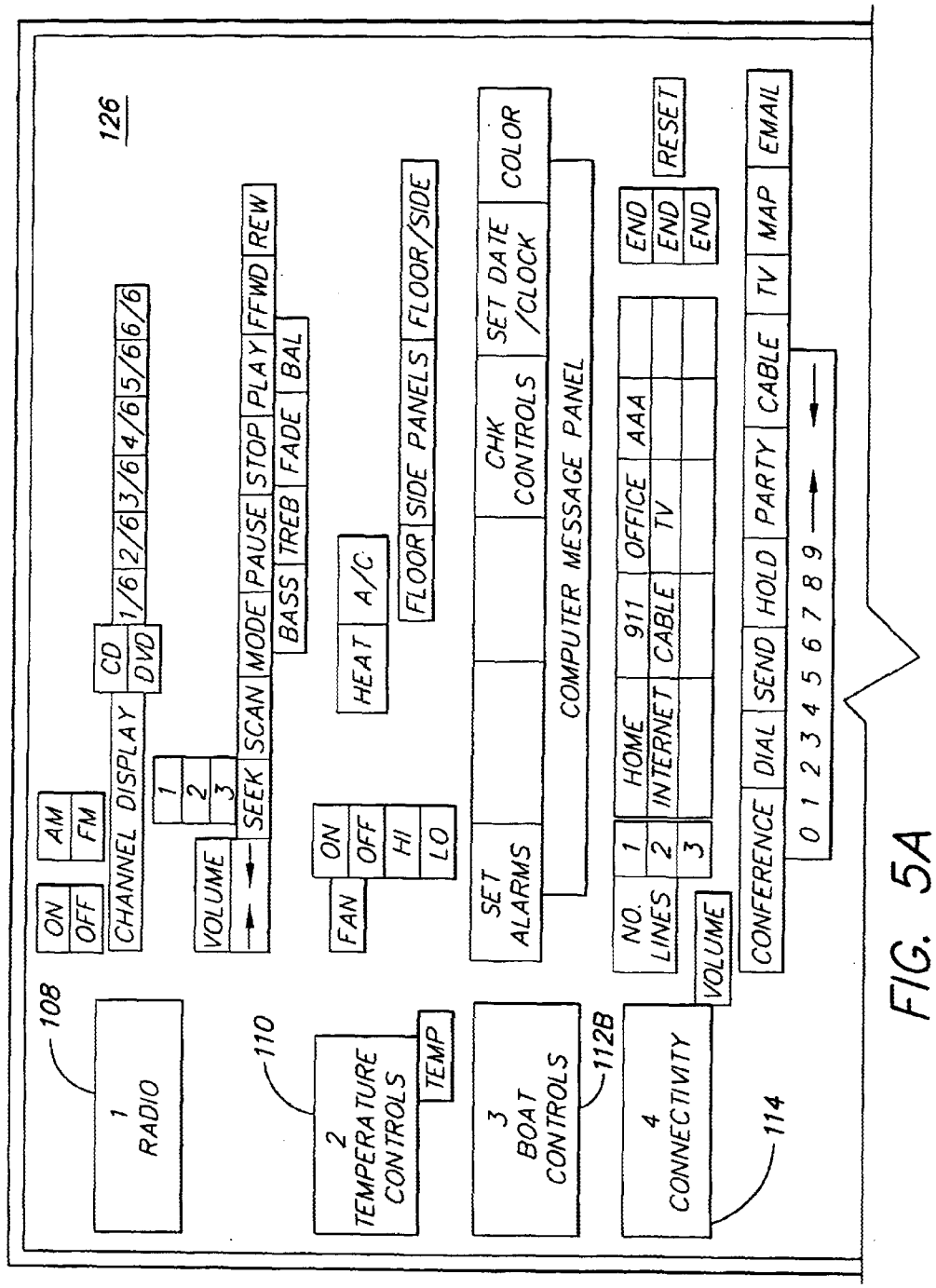
FIG. 5A is a front view of the upper portion of the display screen of the on-board computer system of a boat displaying various features and functionalities.
Figure 5B:
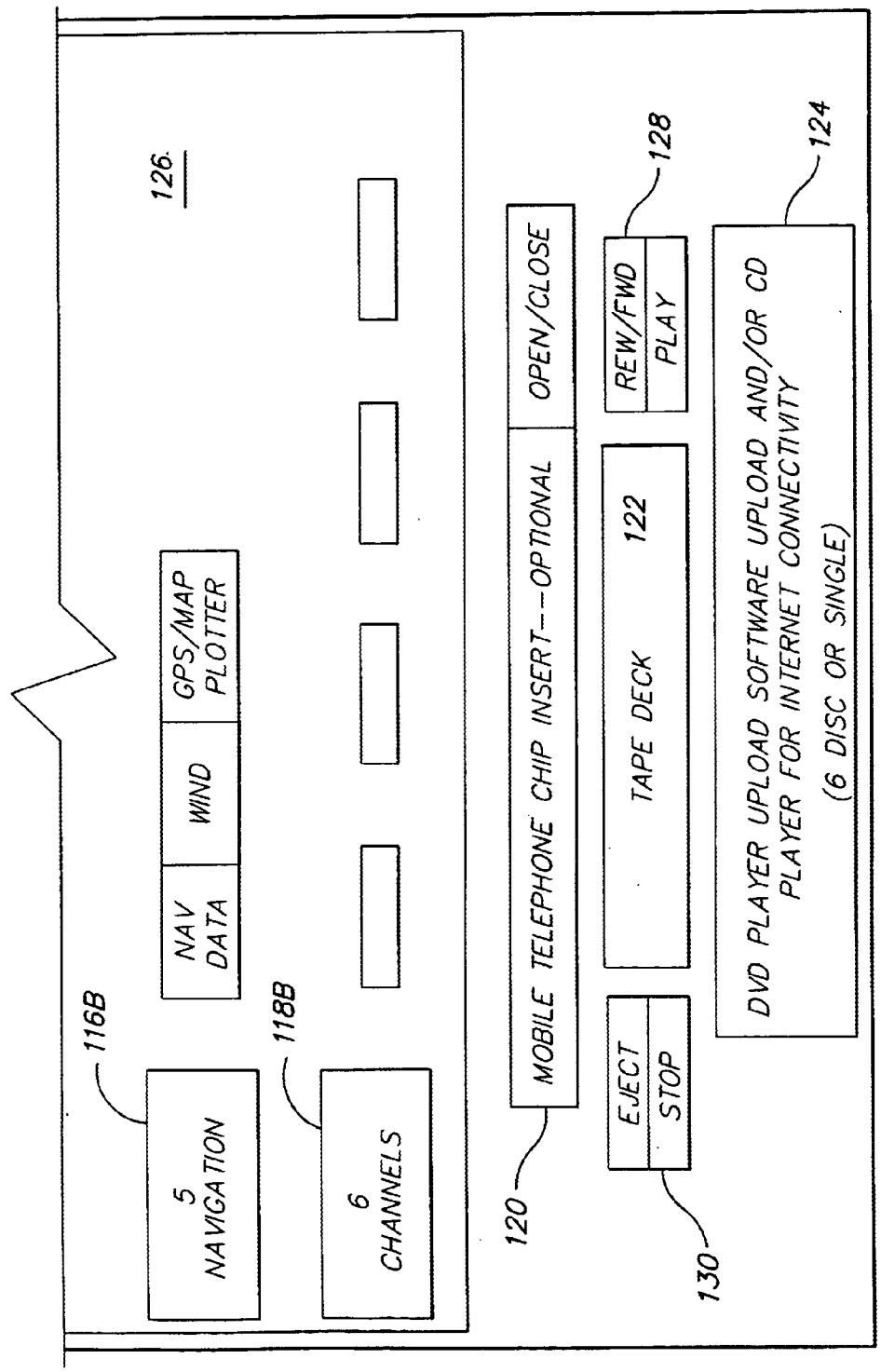
FIG. 5B, which is a continuation of the screen in FIG. 5A, is a front view of the lower portion of the display screen and the bottom portion of the on-board computer system of a boat showing the locations of the various hardware devices.

FIGS. 5A and 5B illustrate the computer 100 that is used in a boat 106. These figures demonstrate that there are many similarities between the computer for car use and that for boat use. With respect to the first four pushbuttons, it is noted that there are no significant changes from the computer 100 used in a car 102. Minor changes in the radio and temperature controls and the nomenclature of the third pushbutton to "Boat Controls" 112B have been made in FIG. 5A. Pushbutton 5 in the boat computer 116B controls the navigation and pushbutton 6 118B controls the various channels for radio communication.

Figure 6:
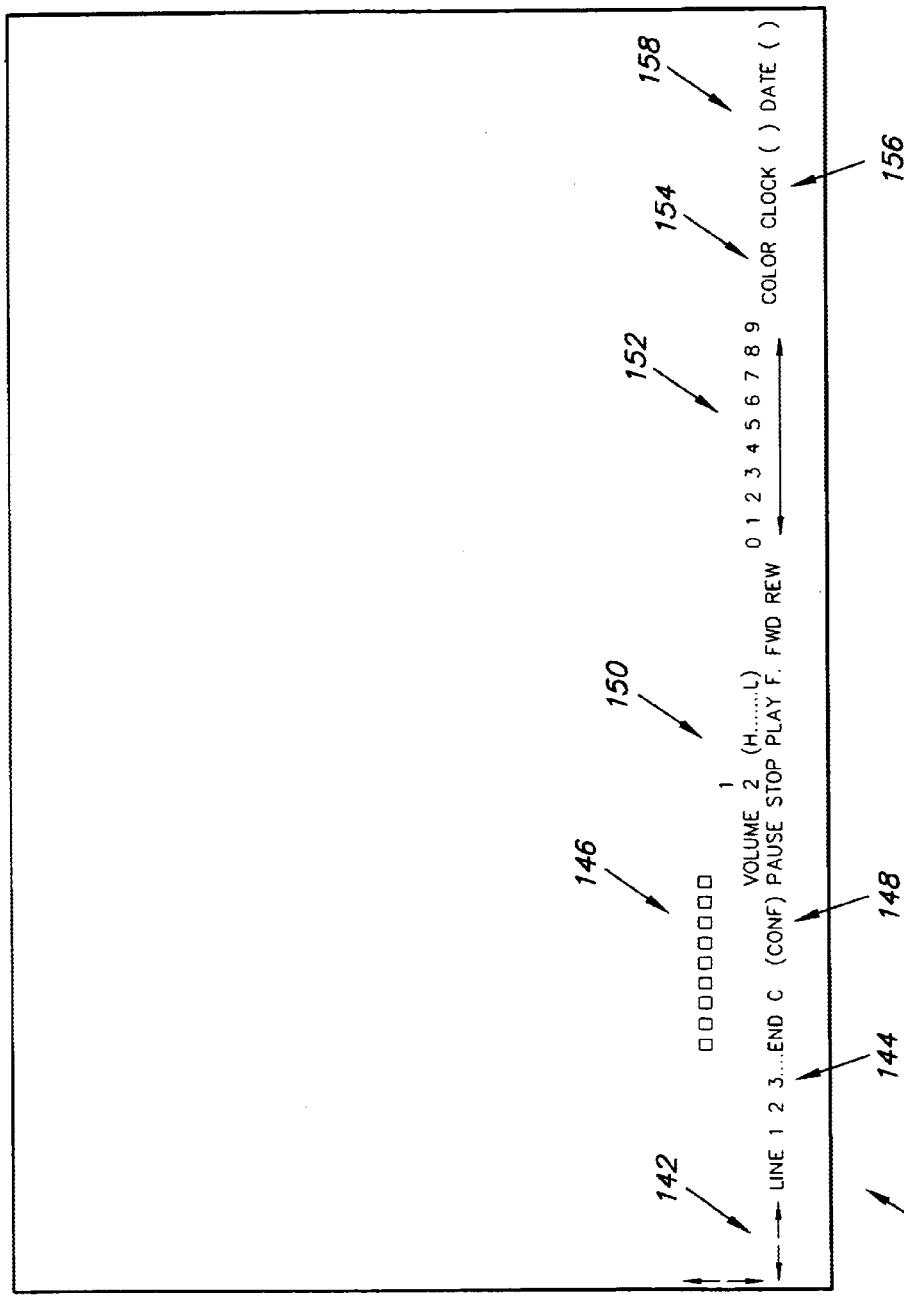
FIG. 6 is a view of an Internet, TV, Conference Calling, Cable Screen showing the controls at the bottom.

FIG. 6 shows a secondary screen 140 which appears when any of the pushbuttons are selected for Internet, Conference Call, DVD, Cable or TV connectivity. The Internet home page, TV, DVD, or Conference viewing can be seen in the upper portion of this screen (which is shown as blank in FIG. 6). The bottom of the screen includes screen controls, which can be in either text or picture format.

The screen controls include navigation pushbuttons 142 for scrolling up or down, left or right, and next or previous screen. Pushbutton 144 is used to answer or place a call. As the pushbutton 144 flashes, probably a different color, when the telephone ring sounds, a pop-up menu should not appear (maybe the pushbutton 144 can be depressed twice to answer the phone). When one of the lines is selected, a pop-up menu appears (similar to the connectivity section displays on the screen). When the End pushbutton is selected, it disconnects the connectivity (with the Internet, TV, conference calling, cellular line, or cable).

The screen controls also include a connectivity symbol 146 showing the strength of connectivity. Since there are three lines and all can be in use at once, there could be three separate signals. The function being used is displayed on the screen. For example, if the DVD is playing, the word "DVD" would appear, and if conference calling is in use, the "CONF" would appear (as shown at 148 in FIG. 6). If more than one function is being used, then both would appear.

Volume and functionality controls 150 function identically to those controls described above with reference to the radio. The screen controls include a number pushbutton panel 152 for telephone, cable, and TV selection. The functionality of the pushbutton panel 152 is similar to that of the of the connectivity section for telephone input, but when the operator is on this screen and in cable TV mode, the station selected is lighted up on the display panel or the number appears in the digital section (e.g. the telephone number). To change a station another number is selected and the connectivity is based on the location of the vehicle, e.g. if the vehicle is in Hartford, Conn., the stations selected would be those in Hartford, Conn.

The color feature 154 functions similarly to that described in the Vehicle section. The clock 156 and date 158 are displayed digitally. If a cellular phone chip is inserted into the computer and if the cellular phone has the options of e-mail and a calendar, this screen can be used for that, as well. All pop-up menus disappear after a few seconds, i.e. after the necessary changes have been made.

When a vehicle malfunction occurs and the operator is on this screen, the top of the screen displays the malfunction message. For example the computer would flash on the screen "Washer Fluid Low" if were appropriate. When the operator is using the main menu, the malfunction message would appear on that screen. The malfunction message would appear in a different color than the menu colors and would persist until the problem was corrected.

As an example of the use of the screen in FIG. 6, if an operator is using the Internet on line 1, the screen would illuminate the "1" on pushbutton 144. If a call comes in on line 2, the "2" on pushbutton 144 would flash. The operator would press Pause, then select line 2, while maintaining the connection with line 1.

Figure 7:
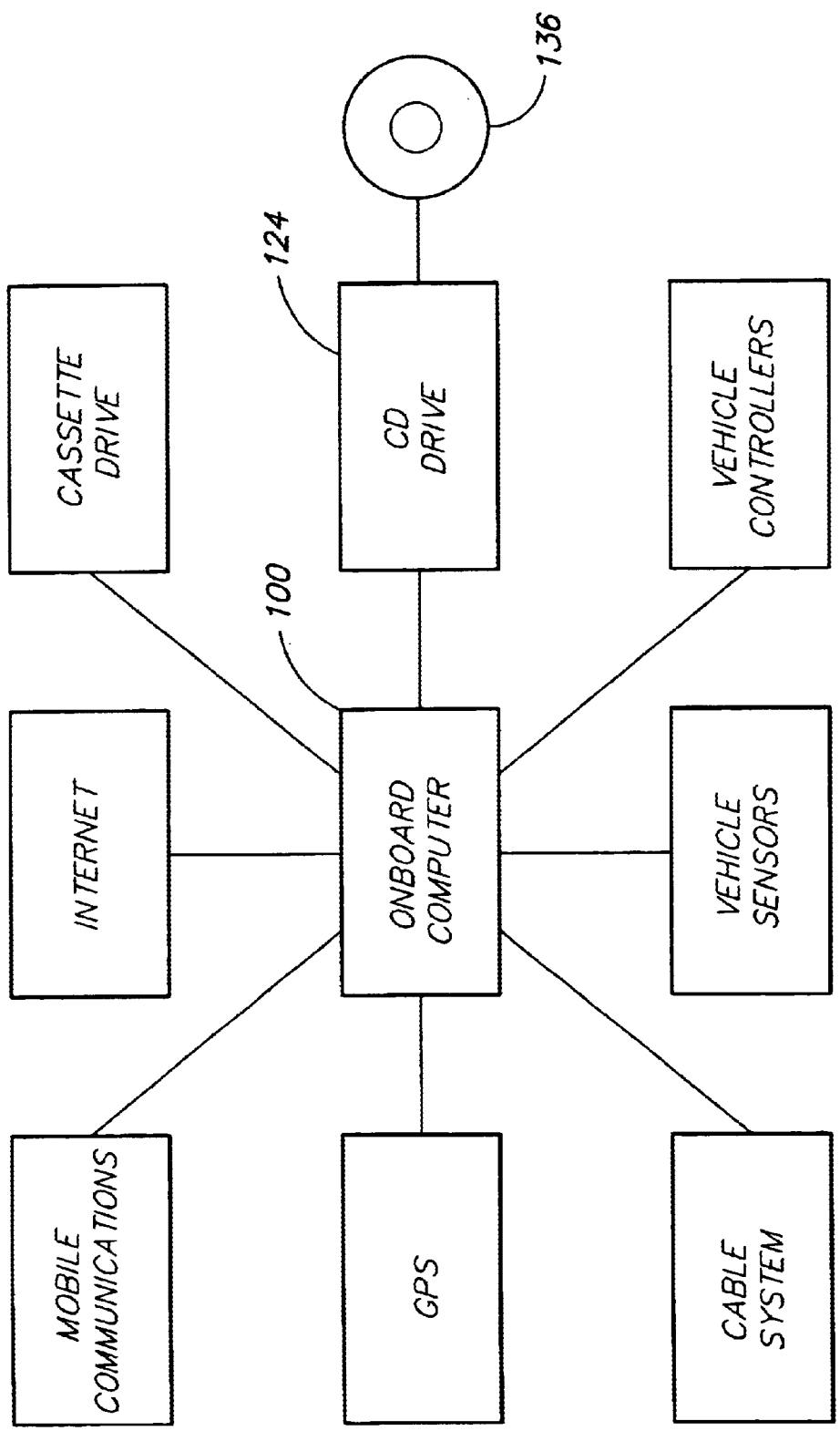
FIG. 7 is a block diagram showing various systems to which the on-board computer system is connected.

FIG. 7 is a block diagram showing various systems to which the on-board computer system 100 is connected. The block diagram shows how the on-board computer system 100 brings together and unifies many diverse systems. The user, via the on-board computer 100, can readily access a wide range of diverse goods and services, and access valuable information. The flexible on-board computer system 100 of the present invention allows vendors to customized their products to meet the specific needs of their customers.

A garage door opener 160, shown in FIG. 8, attached to a keychain 162 can be used to control a garage door as well as the vehicle locks and starting the vehicle. The opener 160 includes a vehicle pushbutton 164 which signals the garage door, Up/Down arrows 166 to indicate the direction for the garage door to move, and a "Stop" pushbutton 168 to stop the movement of the garage door (the movement is started again by activating the arrows 166). The opener 160 also includes pushbuttons for starting the vehicle 170 and locking or unlocking the vehicle 172. In order for the opener to function, a removable chip 174 inside of the device needs to be programmed with a code number matching the vehicle, for example the Vehicle Identification Number or the operator's own code. The chip 174 is then inserted into the chip slot or receptacle 176.

The showing of the garage door opener 160 also serves as an example of a device which can be used in conjunction with the present computer 100 and has a chip slot 176 for receiving a chip 174. Other devices, such as cellular telephones, to be used with the computer 100 include chip slots and removable chips to make them function. The chip used in the mobile telephone can be inserted into the chip insert bay. It is noted that internal programming of the device, i.e. garage door opener 160, a cellular telephone, etc., would obviate the need for and be operatively similar to a chip 174.

As an option, the chip 174 can be inserted in chip insert bay 120 (shown in detail in FIG. 9) and controlled and programmed by the Security Code Access pushbutton 118. The computer 100 may be configured (for security or other reasons) such that the device chip 174 must be in the chip insert bay 120 for the device to function, i.e. the garage door opener 160 or cellular telephone will only function when its chip is in place in the chip insert bay 120. Alternatively, the chips may be movable from the computer to the device and the chip 174 may only need to be in one location, i.e. the bay 120 or the slot 176, for the device to function. The bay 120 is designed to receive many chips, i.e. those controlling mobile phones, speedpasses, garage door openers, etc. and may include numerous slots (more than shown in FIG. 9) for receiving chips.

The flexibility of the instant chip system includes the ability to insert different chips into bay 120 to function with various toll facilities (the speedpass option). Chips may be ordered from the operator of a toll facility and, when in bay 120, remotely signal the toll facility when the car goes through the toll booth. Transfer of funds will occur based on the frequency the speedpass is used and may be facilitated with a link between the user's credit card, direct billing, or billing through the user's cellular telephone company.

In the event that the chip does not need to be in both bay 120 and the chip slot of a cellular telephone, the chip can be alternately inserted into the bay 120 (for calls from the car using the computer 100) or the chip slot of the telephone (for calls remote from the car).

Other identical chips can be inserted into cellular telephones to indicate the number from which that call originates (for billing purposes). For example a cellular telephone provider may provide a number of chips to be used in telephones. Regardless of the telephone in which the chip is used, the billing and telephone number information is received from the chip. This arrangement allows for the change of equipment without reactivating a new number. Changing equipment would merely require using the removing the chip and inserting it into different equipment.

The vehicular computer system of the present invention provides the consumer with information, goods, and services right at their fingertips. The consumer can quickly access any type of information via the Internet and connectivity to home computers. Information such as the nearest hospital, hotel locations and reservations, news, traffic reports, directions, TV/cable for kids, ordering fast food and groceries, and e-mail is readily available. Vehicle operators no longer have to hold on to a telephone while driving. When they are driving and the mobile telephone is in use, it will seem like they are talking to a passenger in the vehicle.

The on-board computer system provides the consumer with access to home security systems where the garage door can be opened or closed and the security can be activated by the vehicle. The on-board computer is a built-in entertainment center for children. They can watch TV, cable, or DVD's, as well as listen to music while adults listen to different music or watch the news or weather. This invention also eliminates the need for children to wear headphones in the car. The multi-speaker system can enhance communications between the driver and the passenger—any directions can be heard clearly. Vehicle manufacturers can enhance the value and versatility of a vehicle by incorporating the vehicular computer system of the present invention.

An internet company could design their software where an option is on the main menu. The option from the main menu could be selected via voice response or touch screen i.e. labeled internet auto. When the option is selected, another menu appears listing, for example, the following options: (of course, options could be categorized like the yellow pages . . . unlimited number of options to select)

Automobiles
Attorney
Directions
Florist
Restaurants (then two sub-categories would appear:
    Fast Food Restaurants
    Family/fine Dining
News
Stock Information
Weather Forecast
White Pages
Yellow Pages
Traffic Report Please note that the defaults set by the application are based on the cellular number via used to reach the Internet. For example, cellular telephone number is 860-xxx-xxxx identifies the 860 area code (CT) as the default. It is noted that default could change by selecting a different state.

When Directions is selected, the following screen would appear. The application would list all states, countries, etc. in alphabetical order. When a specific state or country is selected, the cities display in alphabetical order (for example, as follows).

| State: | City: |
| --- | --- |
| Alabama | Avon |
| Alaska | Bristol |
| Arizona | Canton |
| Arkansas | Coventry |
| California | Darien |
| Colorado | Farmington |
| Connecticut (Default) | Hamden |
| Delaware | Manchester |
| District of Columbia | New Britain |
| Florida | Rockville |
| Georgia | Stamford |
| Hawaii | Tolland |
| Idaho | Union |
| Illinois | Waterbury |
| Indiana | Willington (and other |
| Iowa | cities in CT) |
| Kansas | |
| Kentucky | |
| Louisiana | |
| Maine | |
| Maryland | |
| Massachusetts | |
| Michigan | |
| Minnesota | |
| Mississippi | |
| Missouri | |
| Montana (and all the other states) | |

When state and city are selected, the system would then request an address or telephone number to be selected. All the addresses would be listed in alphabetical order. No numbers would be displayed in front of street, road, or avenue names. Once an address selected, then a number could be entered into the application to get directions. The application would have to have a number panel built into the software for this to occur. Once a number has been entered, if address requires one, then the operator would press the ENTER pushbutton to get directions. Of course, if the car computer includes a GPS system, then this option might not be used as frequently.

The white pages would work in a similar fashion, the only difference would be after selecting city, the application would request only the first three letters of the last name. The application would request the search button to be selected. The application would list in alphabetical order the names (that begin with the letters selected) listing the persons full name and telephone number. (The application would have a pushbutton/voice response alpha keyboard).

However, for other options selected, like Restaurants, the following two sub-categories could appear to be selected: Fast Food Restaurants and Family/Fine Dining Restaurants. When the Fast Food Restaurant option is selected, the application would request a state and city, much like how the Directions option is designed. Once the operator enters required information, then all of the fast food restaurants would appear in alphabetical order such as:

Burger King
Checkers
McDonald's
Wendy's

When a fast food restaurant is selected, for example, Burger King, then all of the Burger Kings in that city location appear on the screen. The address, including exit number from major highway, hours, and telephone number would be listed. At this point, an option could be added in the application where a Burger King could be selected, based on its location, and an order menu would pop up where the consumer could make an order. Once an order has been placed, the application would request credit card number for payment. Once payment is accepted, then the Internet order number would appear. This number would be used for the consumer to pick-up his/her order. If a credit card isn't used, then some other type of payment method could be designed like ATM payment. A sample of the internet fast food menu for Burger King could look as follows:

| Package Order | | Specific Item(s) | | Drinks |
|---|---|---|---|---|
| No. 1 | Jr. Burger | Hamburger | .69 | Sprite |
| | Small French Fry | Cheeseburger | .89 | Coke |
| | Med. Soft drink $3.99 | Chicken Nuggets | 3.25 | Orange |
| | | | | Coffee |
| No. 2 | Whopper Burger | | | Tea |
| | Small French Fry | | | Milk |
| | Small Soft drink $4.29 | Salads: | | |
| No. 3 | Whopper Burger - ¾ lbs | Chefs Salad | | $3.50 |
| | Med. French Fry | Chicken Salad | | $3.75 |
| | Small Soft drink $4.99 | Toss Salad | | $2.99 |
| Quantity:  1  2  3  4  5 | | | | |
| Drink Size:  Small (.99)  Med. ($1.29)  Large ($1.59) | | | | |
| Dressing:  Creamy Italian  LowCal Italian  French  Russian | | | | |
| Condiments:  Ketchup  Mustard  Pickles  Onions  Plain | | | | |
| CANCEL  PROCESS  TOTAL | | | | |

If, for example, No. 1 is selected, then the application would request quantity by illuminating the number panel. The consumer would select quantity. After selecting quantity, the application would illuminate the condiments section for the consumer to select choices. Again, the application would prompt the consumer to select drink choice(s) by illuminating the drink column. When an individual item is selected, for example drink, then the drink size would illuminate along with the price. The price shown is the price for the option selected i.e. drink choice, soda, tea, or coffee, etc. To complete the order the consumer would press the Process pushbutton. The application would summarize the order placed by displaying it below the menu. If, at that time, the consumer needs to modify the order, the consumer could press the CANCEL pushbutton, and the application would display the menu. Below is a sample of the summary screen:

| Order Summary | | | |
|---|---|---|---|
| No. 2; sprite, coffee | Qty. 2 | $4.29 | $8.58 |
| Hamburger | Qty. 1 | $ .69 | .69 |
| Chicken Nuggets | Qty. 1 | $3.25 | 3.25 |
| | Total | | $12.52 |
| Visa/ATM card no.: | | Exp. Date: | ACCEPT: |
| CUST. NO: XXX-XX | | | |
| (display number panel 0 thru 9) | | | |

Note that this type of application could be used for any type of Internet service where consumers want to order items and pick them up. Application uses besides restaurants, could be grocery pick-up, prescription pick-up, etc.

The preferred embodiments of the present invention disclosed herein are intended to be illustrative only and are not intended to limit the scope of the invention. It should be understood by those skilled in the art that various modifications and adaptations of the present invention as well as alternative embodiments of the present invention may be contemplated.

It is to be understood that the present invention is not limited to the sole embodiments described above, but encompasses any and all embodiments within the scope of the following claims.

I claim:

1. A vehicular computer system comprising:

a computer having a chip insert bay;

a remote device having a chip receptacle;

an operating system executing on said computer, said operating system being configured to control functions and connectivity of a vehicle and to interact with said remote device; and at least one chip being alternately insertable into said chip receptacle of said remote device and said insert bay of said computer.

2. The vehicular computer system of claim 1, wherein said remote device is a cellular telephone or a garage door opener.

3. The vehicular computer system of claim 2 wherein said remote device is a cellular telephone and said at least one chip includes telephone number information.

4. The vehicular computer system of claim 1, wherein said at least one chip includes a first chip and a second chip, said first chip being insertable into said insert bay of said computer, and said second chip being insertable into said chip receptacle of said remote device.

5. The vehicular computer system of claim 1, wherein said chip insert bay includes identical multiple slots for receiving multiple chips for communicating with a plurality of remote devices.

6. The vehicular computer system of claim 1 wherein said at least one chip inserted into said insert bay of said computer is programmed to cause said computer to communicate with a tollbooth for facilitation of passage therethrough.

7. A vehicular computer system comprising:
- a computer having a chip insert bay including multiple slots for receiving multiple chips for communicating with a plurality of remote devices;
- a remote device having a chip receptacle;
- an operating system executing on said computer, said operating system being configured to control functions and connectivity of a vehicle and to interact with said remote device; and
- a first chip and a second chip, said first chip being insertable into said insert bay of said computer, and said second chip being insertable into said chip receptacle of said remote device.

8. The vehicular computer system of claim 7, wherein said remote device is a cellular telephone or a garage door opener.

9. The vehicular computer system of claim 8 wherein said remote device is a cellular telephone and said at least one chip includes telephone number information.

* * * * *